UNITED STATES PATENT OFFICE 2,007,382

PRODUCTION OF DISPERSIONS

Tobias Ockman, George Reeves, Edmund Stanley, Henry Charles Olpin, and George Holland Ellis, Spondon, near Derby, England, assignors to Celanese Corporation of America, a corporation of Delaware No Drawing. Application July 7, 1933, Serial No. 679,312. In Great Britain August 16, 1932

9 Claims. (Cl. 8—5)

This invention relates to the production of colouring matters in improved physical form and more particularly to the production of difficultly coagulable dispersions of colouring matters.

In the production of colourations on materials made of or containing organic derivatives of cellulose, much use is made of insoluble or difficultly soluble dyestuffs applied to the material in a dispersed form. The dispersions of dyestuffs employed have, of course, frequently to be kept for a considerable time before being used, and furthermore are frequently used in hot soap solution. Since any flocculation of the dispersion generally leads to uneven and poor dyeings, it is a matter of paramount importance that the dispersions of dyestuff should not coagulate or flocculate either on keeping or in the presence of hot soap solutions.

A number of dyestuffs have, however, been found to form dispersions which coagulate or flocculate in a comparatively short time, especially in the presence of hot soap solutions, so that the dispersions of these dyestuffs become of considerably reduced value for the production of colourations on, for example, cellulose ester or ether materials. Thus for example the dyestuffs obtained by diazotizing 5-nitro-2-amino-anisole and coupling with dimethyl- or diethyl-aniline, dyestuffs of considerable value for the production of red colourations on cellulose ester or ether materials, have been found to form very easily coagulable dispersions when dispersed by the usual methods.

We have now found that certain dyestuffs exist both in relatively stable and relatively unstable or metastable physical modifications, and that whereas the stable modifications may readily be dispersed to form relatively difficultly coagulable dispersions, dispersions of the others rapidly flocculate on keeping or in the presence of hot soap solution. In the case of the azo dyes from 5-nitro-2-amino-anisole and dimethyl- or diethyl-aniline the stable modifications are in the form of crystalline plates, whilst the metastable modifications are gelatinous aggregates or fine needles. Dyestuffs of this character are hereinafter referred to as polymorphous dyestuffs.

Preparations containing polymorphous dyestuffs, in which preparations the dyestuff is in a stable form, are therefore of very great value in that when stored or used in dyeing operations they do not exhibit the readiness to coagulate so frequently characteristic of preparations in which the dyestuff is in the metastable condition. Such aqueous or other preparations containing the dyestuffs in a stable form may be in liquid, paste or other form, and adapted for the colouration of cellulose ester or ether materials or for the preparation, e. g. by dilution, of dyebaths, printing pastes or the like for such materials.

We have further found that the metastable modification may be converted into the stable variety by the action of heat.

The conversion of the polymorphous dyestuff from a metastable to a stable modification may be effected with the dyestuff in the undispersed state and conversion is preferably brought about in the presence of steam, water or other aqueous medium. Alkali often exercises a beneficial action on the conversion whilst the presence of small quantities of a solvent, which is preferably water miscible, is also frequently of advantage. Conversion may be brought about for example by subjecting the dyestuff to the action of steam or hot air or other gas or to the action of hot water. Thus, for example, steam may be blown through the filter press in which the dyestuff has been filtered from the mother liquor after manufacture. Again, the dyestuff may be maintained at a high temperature, e. g. at about 85°–100° C., e. g. 85°–90° C., for some time, for example one to four hours or more according to the temperature employed. This heating may for instance be effected in the aqueous medium in which the dyestuff has been produced or the dyestuff may be first filtered off and heated in fresh water or other aqueous medium.

The stable modifications of dyestuffs obtainable in accordance with the present invention yield comparatively stable aqueous dispersions. Dispersion may very advantageously be brought about by grinding in water, e. g. in a ball-mill, in presence or absence of protective colloids and/or dispersators. Again, it may be effected by treatment with dispersing agents whether alone or in the presence of protective colloids and/or liquids, e. g. water. Such dispersions may be of such strength as to be directly utilizable for dyeing or printing, or they may be in more concentrated form. Concentrated preparations, whether liquid, solid or semi-solid may be prepared by effecting dispersion in a limited quantity of liquid, by removing liquid from less concentrated dispersions or by simply mixing the stable forms of the dyestuffs with dispersing agents and/or protective colloids. The preparations may subsequently be diluted with water, with or without additional dispersing agents and/or protective colloids, in order to form dyebaths, printing pastes, etc. suitable for application to the materials. As dispersing agents particular mention may be made of those described in U. S. Patents Nos. 1,618,413, 1,618,414, 1,694,413, 1,840,572, 1,716,721 and 1,928,647 and British Patent No. 323,788, which may if desired be used either alone or in conjunction with auxiliary solvents as described in U. S. Patents Nos. 1,690,481 and 1,803,008. The more or less concentrated compositions comprising the stable modifications of dyestuffs obtained in accordance with the present invention forms an important part of the invention.

While the invention has been described with particular reference to two insoluble azo dyestuffs, other insoluble azo dyestuffs, e. g. the dyestuff obtainable by coupling diazotized para nitraniline and para xylidine, and other dyestuffs which exist in stable and metastable modifications may also be converted from the metastable to the stable form by the process of the present invention.

The following example illustrates the invention without being in any way limitative:—

Example 84 lbs. of para-nitro-ortho-anisidine are milled in a ball-mill for 5 minutes and the dispersion is then poured into:—

800 lbs. of water
137 lbs. of hydrochloric acid (28%)
350 lbs. of ice and 34 lbs. 8 ozs. of 100% sodium nitrite in 80 lbs. of water added all at once, the mixture being well stirred. When diazotization is complete the mixture is made up to 800 gallons by adding cold water and 60 lbs. of dimethyl aniline added. Stirring is continued for 24 hours when coupling is complete.

The resulting dyestuff suspension is blown through a filter press, washed for 15 minutes with cold water and then for 15 minutes with water at a temperature of 90° C. Live steam is then blown through the press cake for 5 minutes and air then blown for 1 hour. In this way a press cake having approximately 60% of total solids may be obtained, the dyestuff being in a stable form.

What we claim and desire to secure by Letters Patent is:—

1. Process for the production of aqueous dispersions of a polymorphous azo dyestuff of the kind which normally forms aqueous dispersions which coagulate or flocculate readily on heating, which comprises converting a metastable modification of the dyestuff into a stable modification by the action of heat and thereafter dispersing the dyestuff by mechanical comminution in an aqueous medium.

2. Process for the production of aqueous dispersions of a polymorphous azo dyestuff of the kind which normally forms aqueous dispersions which coagulate or flocculate readily on heating, which comprises subjecting a metastable modification of the dyestuff in the undispersed state to the action of heat and thereafter dispersing the dyestuff by mechanical comminution in an aqueous medium.

3. Process for the production of aqueous dispersions of a polymorphous mono-azo dyestuff of the kind which normally forms aqueous dispersions which coagulate or flocculate readily on heating, which comprises subjecting a metastable modification of the dyestuff in the undispersed state in an aqueous medium to the action of heat, and thereafter dispersing the dyestuff by mechanical comminution in an aqueous medium.

4. Process for the production of aqueous dispersions of a polymorphous mono-azo dyestuff of the kind which normally forms aqueous dispersions which coagulate or flocculate readily on heating, which comprises subjecting a metastable modification of the dyestuff in the undispersed state in an aqueous alkaline medium to the action of heat, and thereafter dispersing the dyestuff by grinding in an aqueous medium.

5. Process for the production of aqueous dispersions of a polymorphous mono-azo dyestuff of the kind which normally forms aqueous dispersions which coagulate or flocculate readily on heating, which comprises subjecting a metastable modification of the dyestuff to the action of heat while the dyestuff is in the undispersed state in an aqueous medium containing a water-miscible solvent for the dyestuff, and thereafter dispersing the dyestuff by grinding in an aqueous medium.

6. Process for the production of aqueous dispersions of a polymorphous mono-azo dyestuff derived from azo dye components each of the benzene series, said dyestuff being of the kind which normally forms aqueous dispersions which coagulate or flocculate readily on heating, which comprises converting a meta-stable modification of the dyestuff into a stable modification by the action of heat and thereafter dispersing the dyestuff by mechanical comminution in an aqueous medium.

7. Process for the production of aqueous dispersions of a 4-nitro-2-methoxy-benzene-azo-dialkyl-aniline dyestuff which comprises converting a metastable modification of the dyestuff into a stable modification by the action of heat, and thereafter dispersing the dyestuff by mechanical comminution in an aqueous medium.

8. Process for the production of aqueous dispersions of a polymorphous mono-azo dyestuff of the kind which normally forms aqueous dispersions which coagulate or flocculate readily on heating, which comprises subjecting a metastable modification of the dyestuff in the undispersed state to temperatures of 85 to 100° C. and thereafter dispersing the dyestuff by mechanical comminution in an aqueous medium.

9. Process for the production of aqueous dispersions of a polymorphous mono-azo dyestuff of the kind which normally forms aqueous dispersions which coagulate or flocculate readily on heating, which comprises subjecting a metastable modification of the dyestuff in the undispersed state to the action of live steam, and thereafter dispersing the dyestuff by mechanical comminution in an aqueous medium.

TOBIAS OCKMAN.
GEORGE REEVES.
EDMUND STANLEY.
HENRY CHARLES OLPIN.
GEORGE HOLLAND ELLIS.